Figure 1:
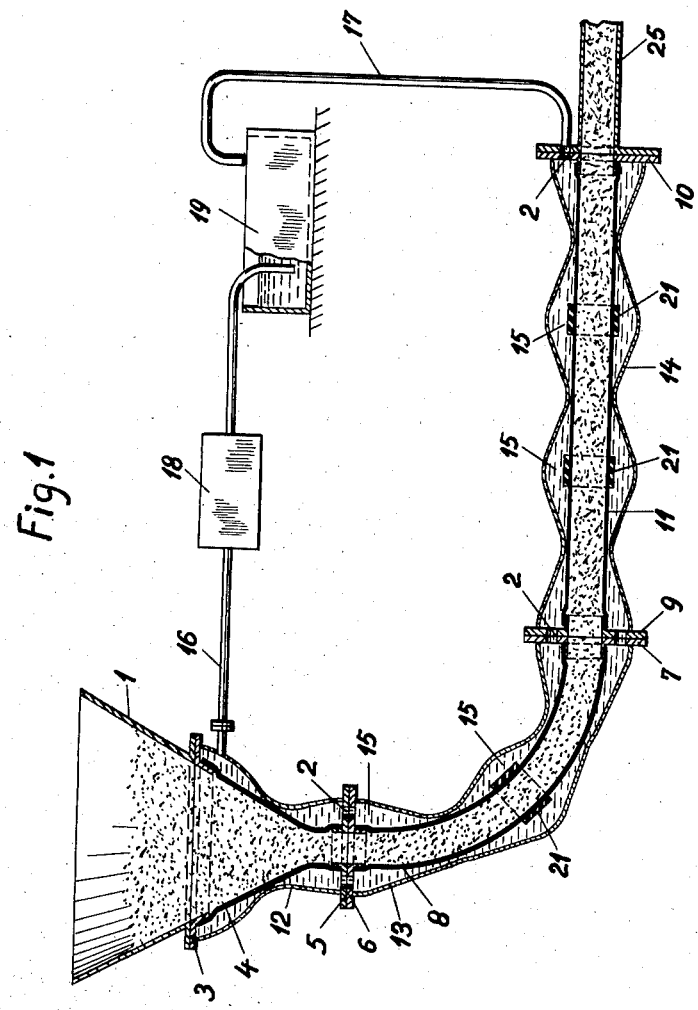

April 8, 1958

V. SVÉDA 2,829,600

CONVEYING SEMI-LIQUID, PLASTIC, LOOSE OR PASTE-LIKE MATERIALS

Filed March 23, 1955

2 Sheets-Sheet 1

INVENTOR
Vladimír Svéda
BY Richard Low
Ag't

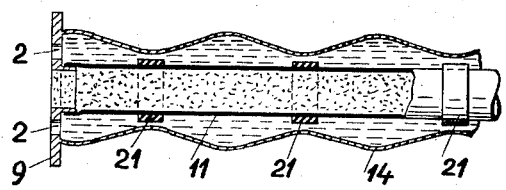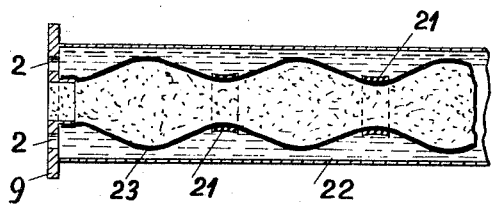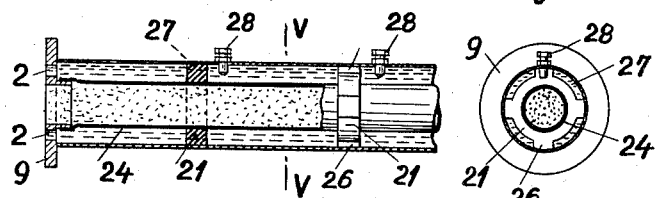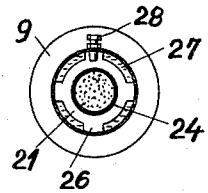

United States Patent Office 2,829,600
Patented Apr. 8, 1958

2,829,600

CONVEYING SEMI-LIQUID, PLASTIC, LOOSE OR PASTE-LIKE MATERIALS

Vladimír Svéda, Prague, Czechoslovakia

Application March 23, 1955, Serial No. 496,307

22 Claims. (Cl. 103—45)

This invention relates to improvements of means for conveying material of semi-liquid, plastic, loose or paste-like consistence.

When conveying semi-liquid or plastic material or material of paste-like consistence through pipes or open troughs, difficulties are experienced, which are caused by the character of the conveyed material. These difficulties are multiplied, if the material is to be pumped upwardly. Some kinds of such material have the tendency to stick to the walls of the conveying means or to form clusters, and in the case of paste-like material, the solids tend to separate from the liquids. This is especially experienced when conveying cement paste, for which reason it is preferred to use for such goods wheel barrows, skip wagons or containers.

It is an object of this invention to provide conveying means for a continuous faultless delivery of material as stated above. Other objects and advantages of the invention will be apparent from the following description and the accompanying drawings wherein Fig. 1 shows a schematic elevation, partly in section, of a conveying system incorporating the principles of this invention, and Figs. 2, 3, 4 and 5 are fragmentary sectional views of modifications.

Referring to Fig. 1, the character 1 indicates a hopper for the material, fixed to the flange 3, to which a part of a flexible hose 4 of conical shape and a frusto-conical solid jacket 12 surrounding the hose 4 are attached. The other ends of both hose and jacket are fixed to the flange 5. The jacket 12 is in one place narrowed, so that the flexible hose rests on this part of the jacket. A further bent part 8 of a flexible hose is fixed to the flange 6 coinciding with flange 5, said hose being surrounded by a solid jacket, in this case a corrugated bent pipe 13, both pipe and hose being attached at their other ends to the flange 7. Similarly a straight part 11 of the flexible hose and a surrounding corrugated pipe 14 are attached to flanges 9 and 10. A discharge pipe 25 is fixed to flange 10.

According to the embodiment shown in Fig. 1, the outer diameter of the flexible hose is somewhat larger than the inner diameter of the narrow parts of the corrugated pipe, so that the hose rests with a certain pressure upon these narrow parts of the pipe, whereas there is no pressure in the spaces between the pipe and the hose. The places of the hose, situated between adjacent touching areas of the hose and pipe are provided with reinforcements 21, reducing substantially the flexibility of the hose in those parts. A number of separate spaces 15 are thus formed between pipe and hose, the spaces at the ends of the pipes being connected to the inlet line 16 and the outlet line 17 of a pressure medium, supplied by the pump 18 from a reservoir 19, into which it is in turn returned by the outlet pipe 17. Bores 2 are provided in the flanges 3, 5, 6, 7, 9 and 10 enabling a free flow of the pressure medium into the spaces 15 of the adjacent conveying elements. The pump 18 is advantageously a single throw piston pump without air chamber, which supplies the pressure medium intermittently to the said spaces 15.

The solid jackets 13, 14 may be metal pipes, which may be fixed by welding to their flanges. The flexible hose 8, 11 is fixed for instance by vulcanising to a metal fitting, by means of which it is attached to the respective flange. The outside diameter of this fitting should be smaller than the inside diameter of the metal pipe, thus enabling the removal of the hose with the fitting in case of cleaning or repairs. The connection between hose and flange should be detachable for instance by means of a bayonet-coupling which is secured by a tightening ring. It is furthermore advantageous to give the flexible hose a certain axial tension.

The material to be conveyed is brought into the hopper 1 and starts to flow continuously into the hoses 4, 8 and 11. If the pump 18 is brought into action, the pressure medium starts to flow periodically into the spaces 15. As these spaces are separated, the hose which up to that moment prevented the communication between these spaces is compressed at the places at the narrower parts of the corrugated pipe, and the material contained within the hose is forced to flow into the adjacent spaces of the hose. The pressure meduum tends to flow from one space 15 into the adjacent one and as the pressure medium is supplied into these spaces intermittently, a successive periodical compressing and release of the flexible hose is thus accomplished, imitating the movements of the peristaltic of the digestive system of living beings.

According to the modification shown in Fig. 2, the outside diameter of the flexible hose 11 is smaller than the inner diameter of the narrow parts of the pipe 14. The parts of the hose, situated close to the narrowed parts of the pipe, are provided with reinforcements 21. An annular space is left between the pipe and the reinforced hose, which offers a certain resistance to the passage of the pressure medium.

According to Fig. 3, the solid pipe 22 is throughout of the same diameter, whilst the diameter of the flexible hose 23 is periodically larger and smaller, the places of smaller diameter being provided with reinforcements 21.

In Figs. 4 and 5 another embodiment is shown, Fig. 5 being a sectional view along the lines V—V in Fig. 4. Here both pipe and flexible hose have a uniform diameter, the hose being provided with reinforcements 21 which have the form of massive rings fixed, for instance by vulcanizing to the flexible hose. These rings are at the same time provided with extensions 26 which determine the axial position of hose 24 with respect to the pipe 22. A number of narrow passages 27 for the pressure medium is thus formed. A number of stops 28 may be provided, which limit a possible axial movement of the hose. In some cases, this axial movement may be used for the propagation of the conveyed material. The narrowed flexible hose stretches in axial direction under the influence of the pressure medium and takes along the material contained therein. As soon as the pressure in the spaces 15 releases, the hose returns by its elasticity into its original position. The distance of the stops 28 from the reinforcements 21 of the flexible hose may be so arranged that successive parts of the flexible hose are called upon to help convey the material. The distances between stops 28 and reinforcements 21 increase from the intake to the outlet of the pressure medium, measured when the pressure medium is not effective. The length of the conveying elements of this kind is of course limited, so that for greater lengths it is necessary to join a number of separate elements. In the case shown, the stops 28 are constituted by setting screws provided with safety nuts.

The choice of material for the solid jacket and the flexible hose depends upon the material to be conveyed and upon the pressure medium which is used. In most cases the solid jacket may be an iron pipe while the hose may be of rubber or different elastic synthetic materials, according to the nature of the material conveyed. In some cases, mutual chemical attacks must be prevented.

The reinforcements 21 of the hose may be made of the same material as the hose or of any other suitable material, for instance, metal. Metal reinforcements may be vulcanized to a rubber hose.

It is sometimes required to maintain a certain temperature of the conveyed goods. The pressure medium supplied to the spaces 15 between jacket and hose may be advantageously used for heating or cooling the conveyed material. In cold weather, conveying, for instance, of cement is thus possible over long distances, while in other cases, for instance in different chemical processes, the time required for the passage of the material through the hose may be used for heating or cooling this material.

As pressure medium water, oil, or any other suitable liquid may be used, in some cases even gases.

It is possible to give the solid jacket any suitable shape so that the conveyed goods may reach its destination in the most advantageous way.

For longer distances, it is possible to divide the whole stretch into a number of conveying elements with separate supply of pressure medium, or it is possible to insert into an existing conveying pipe a number of separate conveying elements according to the invention, which conveying elements propel material through the pipe. A multicylinder pump may be used and the different conveying elements may be fed from different cylinders. It will be sometimes advantageous to act with a certain pressure at the hopper end of the whole system to facilitate the movement of the conveyed material.

What I claim is:

1. A system for conveying material of semiliquid, plastic, loose or paste-like consistency, comprising a flexible hose for conveying the material, a rigid jacket surrounding said hose from end-to-end of the latter and providing a continuous space between said hose and said jacket, means for intermittently feeding a pressure medium into one end of said space, and means for withdrawing the pressure medium from the other end of said space, means within the space to narrow the latter at spaced apart locations, the pressure medium thus generating successive pressure waves in the space to move from one to the other end thereof and to make the flexible hose respond to each pressure wave to perform movements in a wave-like sequence, said movements causing the material to move through the hose.

2. A system for conveying material of semiliquid, plastic, loose or paste like consistency, comprising a flexible hose for conveying the material, a rigid jacket surrounding said hose and providing a space between said hose and said jacket, means for intermittently feeding a pressure medium into one end of said space and for withdrawing the pressure medium from the other end of said space, said space having restrictions therein at spaced apart locations to cause said flexible hose to be narrowed at said locations under the influence of said pressure medium and to return to its original shape after release of pressure in said space.

3. A system for conveying material of semiliquid, plastic, loose or paste like consistency, comprising a flexible hose for conveying said material and having annular reinforcements for limiting its elasticity at spaced apart locations, a rigid jacket surrounding said hose and providing a space between said hose and said jacket, means for intermittently feeding a pressure medium into one end of said space and for withdrawing the pressure medium from the other end of said space said space having restrictions therein which are spaced apart therealong to cause said flexible hose to be narrowed at said restrictions under the influence of said pressure medium and to return to its original shape after release of pressure in said space.

4. A system for conveying material of semiliquid, plastic, loose or paste like consistency, comprising a flexible hose for conveying the material, a rigid jacket surrounding said hose and providing a space between said hose and said jacket, said hose having an axial tension thereon, means for intermittently feeding a pressure medium into one end of said space and for withdrawing the pressure medium from the other end of said space, said space having restrictions therein at spaced apart locations to cause said flexible hose to be narrowed at said locations under the influence of said pressure medium and to return to its original shape after release of pressure in said space.

5. A system for conveying material of semiliquid, plastic, loose or paste like consistency, comprising a flexible hose for conveying the material, a rigid jacket surrounding said hose and providing a space between said hose and said jacket, means for intermittently feeding a pressure medium into one end of said space and for withdrawing the pressure medium from the other end of said space, means for heating said pressure medium, said space having restrictions at spaced apart locations therein to cause said flexible hose to be narrowed at said locations under the influence of said pressure medium and to return to its original shape after release of pressure in said space.

6. A system for conveying material of semiliquid, plastic, loose or paste like consistency, comprising a flexible hose for conveying the material, a rigid jacket surrounding said hose and providing a space between said hose and said jacket, means for intermittently feeding a pressure medium into one end of said space and for withdrawing the pressure medium from the other end of said space, means for cooling said pressure medium, said space having restrictions spaced apart therealong to cause said flexible hose to be narrowed at spaced apart locations under the influence of said pressure medium and to return to its original shape after the release of pressure in said space.

7. A system for conveying material of semiliquid, plastic, loose or paste like consistency, comprising a flexible hose for conveying the material, a pipe of alternately larger and smaller diameters surrounding said hose and providing a space between said hose and said pipe which is restricted at the locations of said smaller diameters, and means for intermittently feeding a pressure medium into one end of said space and for withdrawing the pressure medium from the other end of said space so that the flexible hose is narrowed at the locations of said restrictions in said space under the influence of the pressure medium travelling through said space and returns to its original shape after the release of pressure in said space.

8. A system for conveying material of semiliquid, plastic, loose or paste like consistency, comprising a flexible hose for conveying the material, a pipe of alternately larger and smaller diameters surrounding said hose and providing a space between said hose and said pipe having spaced apart restrictions at the locations of said smaller diameters, said hose having reinforcements thereon limiting its elasticity and situated at locations corresponding to said larger diameters of said pipe, and means for intermittently feeding a pressure medium into one end of said space and for withdrawing the pressure medium from the other end of said space.

9. A system for conveying material of semiliquid, plastic, loose or paste like consistency, comprising a flexible hose for conveying the material, a pipe of alternately larger and smaller diameters surrounding said hose and providing a space between said hose and said pipe having restrictions spaced apart therealong at locations corresponding to said smaller diameters of said pipe, the outer diameter of said hose being larger than the inner diameter of said pipe at said smaller diameters of the latter, said hose having reinforcements limiting its elasticity and situated at locations corresponding to the larger diameters of said pipe, and means for intermittently feeding a pressure medium into one end of said space and for withdrawing the pressure medium from the other end of said space.

10. A system for conveying material of semiliquid, plastic, loose or paste like consistency, comprising a flexible hose for conveying the material, a pipe of alternately larger and smaller diameters surrounding said hose and providing a space between said hose and said pipe, reinforcements on said hose limiting the elasticity of the latter and disposed at locations on the hose corresponding to said smaller diameters of the pipe and leaving a restricted passage between said reinforced hose and said pipe at the location of each smaller diameter of said pipe, and means for intermittently feeding a pressure medium into one end of said space and for withdrawing the pressure medium from the other end of said space.

11. A system for conveying material of semiliquid, plastic, loose or paste like consistency, comprising a flexible hose for conveying the material and having alternately disposed larger and smaller diameters, a rigid jacket surrounding said hose and providing a space between said hose and said jacket having restrictions spaced apart therealong at locations corresponding to said larger diameters of said hose, and means for intermittently feeding a pressure medium into one end of said space and for withdrawing the pressure medium from the other end of said space so that said flexible hose is successively narrowed at the locations of said larger diameters thereof under the influence of the passage of said pressure medium through said space and returns to its original shape after the release of pressure in said space.

12. A system for conveying material of semiliquid, plastic, loose or paste like consistency, comprising a flexible hose for conveying the material and having alternately disposed larger and smaller diameters and reinforcements limiting the elasticity of said hose and disposed at locations corresponding to said smaller diameters thereof, a rigid jacket surrounding said hose and providing a space between said hose and said jacket having spaced apart restrictions at locations corresponding to said larger diameters of said hose, and means for intermittently feeding a pressure medium into one end of said space and for withdrawing the pressure medium from the other end of said space.

13. A system for conveying material of semiliquid, plastic, loose or paste like consistency, comprising a flexible hose for conveying the material and having alternately disposed larger and smaller diameters and reinforcements thereon at spaced apart locations corresponding to said smaller diameters of the hose for there limiting the elasticity of the hose, a solid pipe of substantially constant diameter surrounding said hose and providing a space between said hose and said pipe having spaced apart restrictions therein at locations corresponding to said larger diameters of said hose, and means for intermittently feeding a pressure medium into one end of said space and for withdrawing the pressure medium from the other end of said space.

14. A system for conveying material of semiliquid, plastic, loose or paste like consistency, comprising a flexible hose for conveying the material and having a substantially constant diameter and annular reinforcements thereon at spaced apart locations for limiting the elasticity of the hose at said locations, a rigid jacket surrounding said hose and providing a space between said hose and said jacket having restrictions therein which are spaced apart along said space, and means for intermittently feeding a pressure medium into one end of said space and for withdrawing the pressure medium from the other end of said space.

15. A system for conveying material of semiliquid, plastic, loose or paste like consistency, comprising a flexible hose of substantially constant diameter for conveying the material and having limited elasticity at locations spaced apart along the hose, a pipe of substantially constant diameter surrounding said hose and providing a space between said hose and said pipe having restrictions therein at locations corresponding to the limited elasticity of said hose, and means for intermittently feeding a pressure medium into one end of said space and for withdrawing the pressure medium from the other end of said space.

16. A system for conveying material of semiliquid, plastic, loose or paste like consistency, comprising a flexible hose of substantially constant diameter for conveying the material, annular reinforcements on said hose at spaced apart locations there limiting the elasticity of said hose, a pipe of substantially constant diameter surrounding said hose and providing a space between said hose and said pipe, said annular reinforcements having radial extensions on the periphery thereof engaging the interior surface of said pipe and determining the position of said hose with respect to said pipe, said annular reinforcements defining restrictions in said space and restricted passages between said radial extensions, and means for intermittently feeding a pressure medium into one end of said space and for withdrawing the pressure medium from the other end of said space, so that said hose is successively narrowed in response to the movement of the pressure medium through said space and returns to its original shape after release of pressure in said space.

17. A system for conveying material of semiliquid, plastic, loose or paste like consistency, comprising a flexible hose for conveying the material and having annular reinforcements thereon at spaced apart locations for limiting the elasticity of the hose at said locations, a rigid jacket surrounding said hose and providing a space between said hose and said jacket with said annular reinforcements forming spaced apart restrictions in said space, means for intermittently feeding a pressure medium into one end of said space and for withdrawing the pressure medium from the other end of said space, and stops within said jacket cooperating with said annular reinforcements to limit the axial movement of said flexible hose due to the action of the pressure medium against said reinforcements.

18. A system for conveying material of semiliquid, plastic, loose or paste like consistency, comprising a flexible hose for conveying the material, annular reinforcements on said hose at spaced apart locations for there limiting the elasticity of the hose, a rigid jacket surrounding said hose and providing a space between said hose and said jacket, said reinforcements forming spaced apart restrictions within said space, means for intermittently feeding a pressure medium into one end of said space and for withdrawing the pressure medium from the other end of said space, and a stop member for each of said reinforcements extending from said jacket into said space and spaced apart from the related reinforcement in the direction away from said one end of said space when said hose is in an axially unstretched condition so that, when the pressure medium is supplied to said space and acts successively against said reinforcements to cause axial stretching of said hose, said stop members and reinforcements cooperate to permit only a limited axial movement of said hose.

19. A system for conveying material of semiliquid, plastic, loose or paste like consistency as in claim 18, wherein the distance between each stop member and the related annular reinforcement, when the pressure in said space is released and the hose is in its axially unstretched condition, increases from said one end to said other end of said space.

20. A system for conveying material of semiliquid, plastic, loose or paste like consistency, comprising a flexible hose for conveying the material, annular reinforcements of the same material as said hose disposed upon the latter at spaced apart locations and limiting the elasticity of the hose at said locations, a rigid jacket surrounding said hose and providing a space between said hose and said jacket, and means for intermittently feeding a pressure medium into one end of said space and for withdrawing the pressure medium from the other end of said space.

21. A system for conveying material of semiliquid, plastic, loose or paste like consistency, comprising a flexible hose for conveying the material, annular reinforcements of a material different from that of said hose and disposed on the latter at spaced apart locations for limiting the elasticity of the hose at said locations, a rigid jacket surrounding said hose and providing a space between said hose and said jacket, and means for intermittently feeding a pressure medium into one end of said space and for withdrawing the pressure medium from the other end of said space.

22. A system for conveying material of semiliquid, plastic, loose or paste like consistency, comprising a flexible hose for conveying the material, a rigid jacket surrounding said hose and providing a space between said hose and said jacket having restrictions spaced apart along said space, and single throw pump means intermittently feeding pressure medium into one end of said space and withdrawing the pressure medium from the other end of said space so that, said flexible hose is narrowed at said locations of the restrictions under the influence of said pressure medium and returns to its original shape after the release of pressure in said space.

References Cited in the file of this patent
UNITED STATES PATENTS

| | | |
|---|---|---|
| 2,196,993 | Ridder | Apr. 16, 1940 |
| 2,291,912 | Meyers | Aug. 4, 1942 |